(12) United States Patent
Katpelly et al.

(10) Patent No.: US 9,247,297 B2
(45) Date of Patent: *Jan. 26, 2016

(54) PREVIEW-BASED CONTENT MONITORING AND BLOCKING SYSTEM

(71) Applicant: ELOY TECHNOLOGY, LLC, Wilmington, DE (US)

(72) Inventors: Ravi Reddy Katpelly, Durham, NC (US); Christopher M. Amidon, Apex, NC (US); Kunal Kandekar, Jersey City, NJ (US)

(73) Assignee: ELOY TECHNOLOGY, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/250,502

(22) Filed: Apr. 11, 2014

(65) Prior Publication Data

US 2014/0223468 A1 Aug. 7, 2014

Related U.S. Application Data

(63) Continuation of application No. 12/769,691, filed on Apr. 29, 2010, now Pat. No. 8,701,137.

(60) Provisional application No. 61/173,628, filed on Apr. 29, 2009.

(51) Int. Cl.
*H04N 7/16* (2011.01)
*H04N 21/454* (2011.01)
(Continued)

(52) U.S. Cl.
CPC ...... *H04N 21/4542* (2013.01); *G11B 20/10527* (2013.01); *G11B 27/105* (2013.01); *H04N 5/76* (2013.01); *H04N 5/765* (2013.01); *H04N 9/7921* (2013.01); *H04N 21/4135* (2013.01); *H04N 21/4325* (2013.01); *H04N 21/4334* (2013.01);
(Continued)

(58) Field of Classification Search
USPC .................. 725/25, 27, 28, 29, 30, 34, 45, 46
See application file for complete search history.

(56) References Cited

U.S. PATENT DOCUMENTS 5,195,135 A 3/1993 Palmer
5,778,135 A 7/1998 Ottesen et al.
(Continued)

OTHER PUBLICATIONS

"CableCARD," Wikipedia, found at <http://en.wikipedia.org/wiki/CableCARD> on Internet Archive, dated Jan. 7, 2009, page last modified Jan. 4, 2009, printed May 31, 2011, 10 pages.
(Continued)

*Primary Examiner* — Nnenna Ekpo

(57) ABSTRACT

Systems and devices are disclosed for monitoring and controlling usage of media content by blocking usage of media segments. In one embodiment, usage data defining usage, or consumption, of the media content is obtained. A pattern in media segments in the media content based on the usage data is detected when the media segments satisfy at least one defined criterion and are consumed at least a predefined threshold amount. Usage of at least one of the media segments is blocked. In one embodiment, one or more additional media segments accessible to the one or more media devices that are similar to the at least one of the one or more media segments for which usage is blocked at the one or more media devices is identified. Usage of at least one of the one or more additional media segments at the one or more media devices is blocked.

19 Claims, 10 Drawing Sheets

(51) Int. Cl.

| | |
|---|---|
| *G11B 20/10* | (2006.01) |
| *G11B 27/10* | (2006.01) |
| *H04N 5/76* | (2006.01) |
| *H04N 5/765* | (2006.01) |
| *H04N 9/79* | (2006.01) |
| *H04N 21/41* | (2011.01) |
| *H04N 21/432* | (2011.01) |
| *H04N 21/433* | (2011.01) |
| *H04N 21/436* | (2011.01) |
| *H04N 21/44* | (2011.01) |
| *H04N 21/4402* | (2011.01) |
| *H04N 21/458* | (2011.01) |
| *H04N 21/4363* | (2011.01) |

(52) U.S. Cl.
CPC ... *H04N 21/43615* (2013.01); *H04N 21/44016* (2013.01); *H04N 21/440218* (2013.01); *H04N 21/4583* (2013.01); *G11B 2020/10537* (2013.01); *H04N 21/4363* (2013.01)

(56) References Cited

U.S. PATENT DOCUMENTS

| | | | |
|---|---|---|---|
| 5,912,696 A | 6/1999 | Buehl | |
| 5,973,683 A | 10/1999 | Cragun et al. | |
| 6,009,116 A | 12/1999 | Bednarek et al. | |
| 6,029,195 A * | 2/2000 | Herz | G06F 17/30867 348/E7.056 |
| 6,057,872 A * | 5/2000 | Candelore | H04N 7/17318 348/E7.071 |
| 6,151,444 A | 11/2000 | Abecassis | |
| 6,181,364 B1 | 1/2001 | Ford | |
| 6,260,192 B1 | 7/2001 | Rosin et al. | |
| 6,400,478 B1 | 6/2002 | Cheng et al. | |
| 6,438,579 B1 | 8/2002 | Hosken | |
| 6,496,744 B1 | 12/2002 | Cook | |
| 6,519,770 B2 | 2/2003 | Ford | |
| 6,636,607 B1 | 10/2003 | Yang et al. | |
| 6,684,240 B1 | 1/2004 | Goddard | |
| 6,754,904 B1 | 6/2004 | Cooper et al. | |
| 6,973,665 B2 * | 12/2005 | Dudkiewicz | G06F 17/30017 348/E5.006 |
| 7,020,893 B2 | 3/2006 | Connelly | |
| 7,046,139 B2 | 5/2006 | Kuhn et al. | |
| 7,055,165 B2 | 5/2006 | Connelly | |
| 7,120,254 B2 | 10/2006 | Glick et al. | |
| 7,139,820 B1 | 11/2006 | O'Toole, et al. | |
| 7,185,355 B1 | 2/2007 | Ellis et al. | |
| 7,231,604 B1 | 6/2007 | Franken et al. | |
| 7,260,823 B2 * | 8/2007 | Schlack | G06Q 30/02 348/E7.071 |
| 7,398,008 B2 | 7/2008 | Frederick et al. | |
| 7,398,327 B2 | 7/2008 | Lee | |
| 7,398,544 B2 | 7/2008 | Candelore et al. | |
| 7,403,617 B2 | 7/2008 | Chaney | |
| 7,403,618 B2 | 7/2008 | Van Rijnsoever et al. | |
| 7,496,948 B1 | 2/2009 | Hamilton, II et al. | |
| 7,555,465 B2 | 6/2009 | Davidson | |
| 7,647,332 B2 | 1/2010 | Van Flandern et al. | |
| 7,672,280 B2 | 3/2010 | Shim et al. | |
| 7,703,112 B2 | 4/2010 | Ohnishi et al. | |
| 7,716,662 B2 | 5/2010 | Seiden | |
| 7,720,935 B2 | 5/2010 | Anantha | |
| 7,818,764 B2 * | 10/2010 | Matz | H04N 7/163 725/34 |
| 8,024,765 B2 | 9/2011 | Ramanathan et al. | |
| 8,261,300 B2 | 9/2012 | Barton et al. | |
| 8,266,657 B2 | 9/2012 | Margulis | |
| 8,572,654 B2 | 10/2013 | Knudson et al. | |
| 8,631,456 B2 | 1/2014 | Reisman | |
| 2002/0147782 A1 | 10/2002 | Dimitrova et al. | |
| 2002/0194598 A1 | 12/2002 | Connelly | |
| 2003/0028871 A1 * | 2/2003 | Wang | H04H 60/65 725/9 |
| 2003/0066074 A1 | 4/2003 | Zimmerman et al. | |
| 2003/0067554 A1 | 4/2003 | Klarfeld et al. | |
| 2003/0101451 A1 * | 5/2003 | Bentolila | G06Q 30/0251 725/34 |
| 2003/0117428 A1 | 6/2003 | Li et al. | |
| 2003/0192045 A1 | 10/2003 | Fellenstein et al. | |
| 2004/0003393 A1 | 1/2004 | Gutta et al. | |
| 2004/0197088 A1 * | 10/2004 | Ferman et al. | 386/117 |
| 2004/0221303 A1 | 11/2004 | Sie et al. | |
| 2005/0002638 A1 | 1/2005 | Putterman et al. | |
| 2005/0097595 A1 | 5/2005 | Lipsanen et al. | |
| 2005/0114534 A1 | 5/2005 | Lee | |
| 2005/0213519 A1 | 9/2005 | Relan et al. | |
| 2005/0246740 A1 | 11/2005 | Teraci | |
| 2005/0251820 A1 | 11/2005 | Stefanik et al. | |
| 2006/0020960 A1 | 1/2006 | Relan et al. | |
| 2006/0101492 A1 | 5/2006 | Lowcock | |
| 2006/0117371 A1 | 6/2006 | Margulis | |
| 2006/0130119 A1 | 6/2006 | Candelore et al. | |
| 2006/0173782 A1 | 8/2006 | Gargi | |
| 2006/0271949 A1 | 11/2006 | Perry et al. | |
| 2007/0055980 A1 | 3/2007 | Megeid et al. | |
| 2007/0126884 A1 | 6/2007 | Xu et al. | |
| 2007/0150918 A1 | 6/2007 | Carpenter et al. | |
| 2007/0154168 A1 * | 7/2007 | Cordray et al. | 386/83 |
| 2007/0157260 A1 * | 7/2007 | Walker | 725/86 |
| 2007/0180463 A1 | 8/2007 | Jarman | |
| 2007/0204287 A1 | 8/2007 | Conradt et al. | |
| 2007/0243869 A1 | 10/2007 | Kwon et al. | |
| 2007/0250852 A1 | 10/2007 | Adams et al. | |
| 2007/0297641 A1 | 12/2007 | Criddle et al. | |
| 2008/0022322 A1 | 1/2008 | Grannan et al. | |
| 2008/0092157 A1 | 4/2008 | Walter et al. | |
| 2008/0141293 A1 | 6/2008 | Blanchard et al. | |
| 2008/0222673 A1 | 9/2008 | Durden et al. | |
| 2009/0012805 A1 | 1/2009 | Schnell et al. | |
| 2009/0013185 A1 | 1/2009 | Lim | |
| 2009/0019501 A1 | 1/2009 | Saxena et al. | |
| 2009/0033515 A1 | 2/2009 | Cavanaugh | |
| 2009/0044226 A1 | 2/2009 | Ellis et al. | |
| 2009/0083782 A1 | 3/2009 | Card, II | |
| 2009/0100182 A1 | 4/2009 | Chaudhry | |
| 2009/0125971 A1 | 5/2009 | Belz et al. | |
| 2009/0288131 A1 | 11/2009 | Kandekar et al. | |
| 2009/0293079 A1 | 11/2009 | McKee et al. | |
| 2009/0328087 A1 | 12/2009 | Higgins et al. | |
| 2010/0011391 A1 | 1/2010 | Carpenter et al. | |
| 2010/0153566 A1 | 6/2010 | Sheleheda et al. | |
| 2010/0186034 A1 | 7/2010 | Walker | |
| 2012/0117585 A1 | 5/2012 | Curtis et al. | |

OTHER PUBLICATIONS

"Conditional access," Wikipedia, found at <http://en.wikipedia.org/wiki/Conditional_access> on Internet Archive, dated Jun. 10, 2009, page last modified Apr. 20, 2009, printed Jun. 1, 2011, 3 pages.

Gallery, E. and Tomlinson, A., "Conditional Access in Mobile Systems: Securing the Application," in First International Conference on Distributed Frameworks for Multimedia Applications (DFMA 2005), Feb. 6-9, 2005, Besancon, France, pp. 190-197, IEEE, 2005, 8 pages.

"Conditional access module," Wikipedia, found at <http://en.wikipedia.org/wiki/Conditional_access_module> on Internet Archive, dated Nov. 4, 2008, page last modified Aug. 13, 2008, printed Jun. 1, 2011, 2 pages.

"Conditional access system," Wikipedia, found at <http://en.wikipedia.org/wiki/Conditional_access_system> on Internet Archive, dated Jan. 10, 2009, page last modified Jan. 8, 2009, printed Jun. 1, 2011, 4 pages.

"Downloadable Conditional Access System," Wikipedia, found at <http://en.wikipedia.org/wiki/Downloadable_Conditional_Access_System> on Internet Archive, dated Feb. 9, 2009, page last modified Dec. 2, 2008, printed Jun. 1, 2011, 3 pages.

"Motion Picture Association of America film rating system," Wikipedia, at <http://en.wikipedia.org/wiki/MPAA_rating>, found

(56) References Cited

OTHER PUBLICATIONS on the Internet Archive, dated Oct. 6, 2008, page last modified Oct. 3, 2008, printed May 27, 2011, 13 pages.

"Television content rating systems," Wikipedia, found on the Internet Archive at <http://en.wikipedia.org/wiki/Television_rating_system>, dated Feb. 20, 2009, page last modified Feb. 18, 2009, printed May 27, 2011, 16 pages.

"TV Timer—BOB," at <http://www.familysafemedia.com/tv_timer_hopscotch_bob.html>, copyright 1998-2009, Nextphase, Inc. d.b.a. Family Safe Media, printed Nov. 23, 2009, 3 pages.

"Using Your DVR-S Parental Control—MonkeySee," at <http://www.monkeysee.com/play/8063-using-your-dvr-s-parental-control>, from the Internet Archive dated Jul. 4, 2008, printed Aug. 10, 2012, 4 pages.

"V-chip" Wikipedia, at <http://en.wikipedia.org/wiki/Vchip>, found on Internet Archive dated May 17, 2008, page last modified Apr. 30, 2008, printed Jan. 23, 2012, 6 pages.

"V-chip" Wikipedia, at <http://en.wikipedia.org/wiki/Vchip>, page last modified May 22, 2011, printed May 27, 2011, 11 pages. cited by applicant.

* cited by examiner

PREVIEW-BASED CONTENT MONITORING AND BLOCKING SYSTEM

CROSS-REFERENCE TO RELATED APPLICATIONS

This application is a continuation of U.S. patent application Ser. No. 12/769,691 titled Preview-Based Content Monitoring And Blocking System," filed on Apr. 29, 2010 (now U.S. Pat. No. 8,701,137 issued Apr. 15, 2014) and claims the benefit of provisional patent application Ser. No. 61/173,628, filed Apr. 29, 2009, the entire disclosures of which are hereby incorporated by reference herein.

BACKGROUND

The present disclosure relates to monitoring and controlling usage, or consumption, of media content.

Monitoring and controlling recording and playback of objectionable, or unsuitable, media content in the home is a concern for most parents. Current technologies for restricting access to media content include a password or an access code protecting restricted content (e.g., television channels) and software, such as ClearPlay, that filters objectionable content from movies. However, current technologies for restricting access to media content do not adequately enable parents to monitor and control usage of media content in their homes.

SUMMARY

Systems and devices are disclosed for monitoring and controlling usage of media content by blocking usage of media segments. In one embodiment, usage data defining usage, or consumption, of the media content is obtained. A pattern in media segments in the media content based on the usage data is detected when the media segments satisfy at least one defined criterion and are consumed at least a predefined threshold amount. Usage of at least one of the media segments is blocked.

In one embodiment, in addition to blocking usage of the at least one of the one or media segments, one or more additional media segments of the media content accessible to the one or more media devices that are similar to the at least one of the one or more media segments for which usage is blocked at the one or more media devices is identified. Usage of at least one of the one or more additional media segments at the one or more media devices is blocked.

In one embodiment, a system is provided for monitoring and blocking usage of media content. The system comprises at least one media broker sending communications to and receiving communications from one or more mobile devices. The at least one media broker is configured to: obtain usage data defining usage of media content at one or more of the one or more mobile devices, detect a pattern including at least one media segment in the media content consumed based on the usage data and one or more predefined pattern detection rules, and block usage of the at least one media segment included in the pattern.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
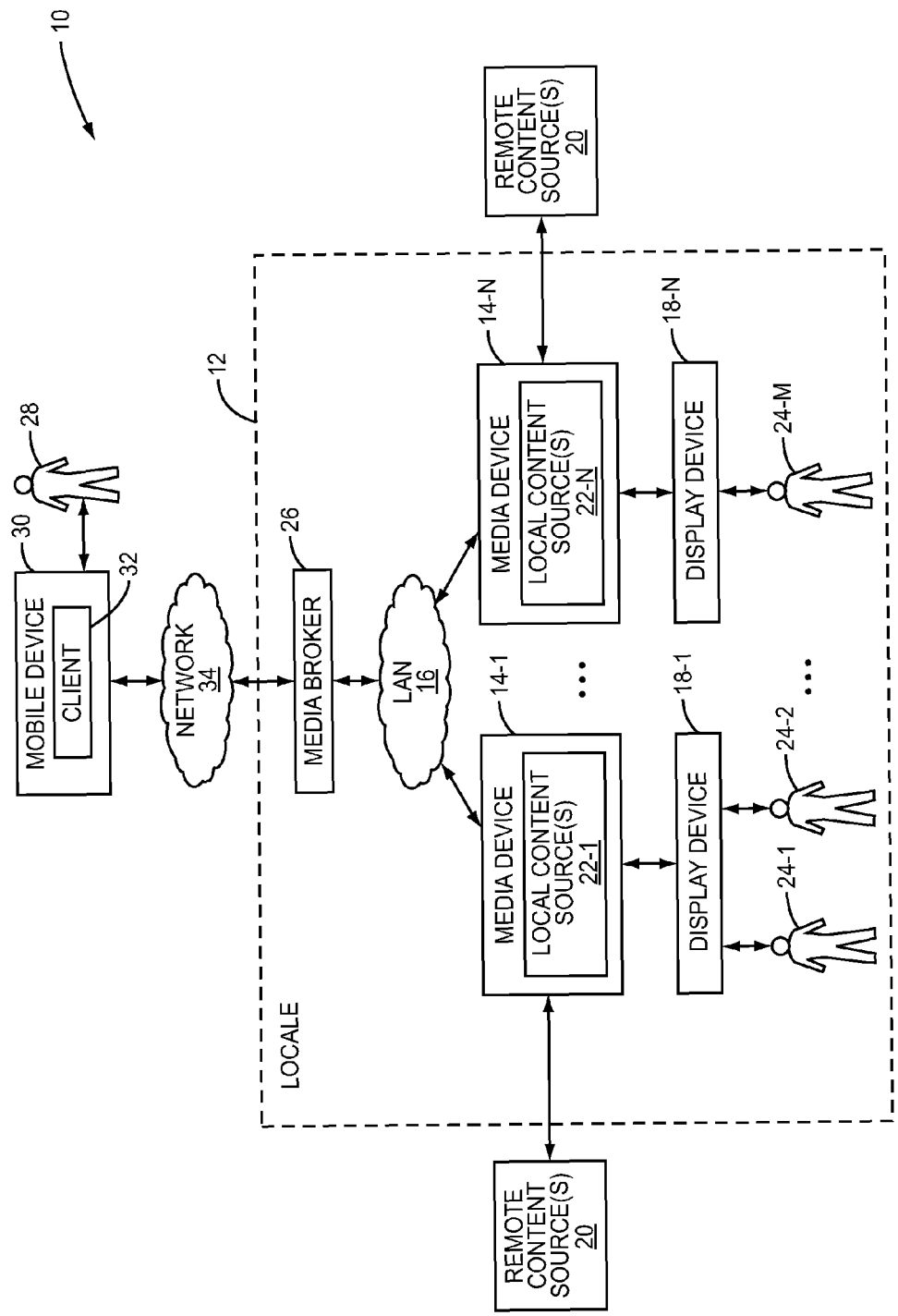
FIG. 1 illustrates a system for monitoring and controlling usage of media content in a locale according to one embodiment of the present disclosure.

FIG. 1 illustrates a system 10 for monitoring and controlling usage, or consumption, of media content within a locale 12 according to one embodiment of the present disclosure. The locale 12 is preferably a home environment (i.e., a person's home). However, the locale 12 is not limited thereto. As illustrated, the system 10 includes a number of media devices 14-1 through 14-N, which are also generally referred to herein as media devices 14 or media device 14, located within the locale 12. The media devices 14 are connected via a Local Area Network (LAN) 16. Each of the media devices 14 is connected to the LAN 16 via a wired connection such as, for example, an Ethernet connection or a local wireless connection such as, for example, an IEEE 802.11x wireless connection or Wi-Fi connection, a Bluetooth® connection, or the like. The media devices 14 are generally any device having media playback and networking capabilities. For example, each of the media devices 14 may be a set-top box that operates to obtain television content from a television service provider (e.g., a cable or satellite television service provider), a Digital Video Recorder (DVR) that operates to obtain and record television content from a television service provider, a personal computer that obtains downloadable or streaming content from an Internet source (e.g., Hulu™, CBS.com, iTunes®, Netflix® streaming service, or the like), an Apple TV® device, a gaming console having media playback and networking capabilities that obtains media content from an Internet source, a set-top box or similar device for playing streaming media content (e.g., a Roku® digital video player), a DVD or Blu-ray player, or the like.

The media devices 14-1 through 14-N have associated display devices 18-1 through 18-N, which are also referred to herein as display devices 18 or display device 18. In this embodiment, the display devices 18 are external to the media devices 14 and are connected to the media devices 14 via wired connections such as, for example, DVI or HDMI connections or local wireless connections such as, for example, IEEE 802.11x or Bluetooth® connections. For example, the display devices 18 may be televisions, monitors, or the like. Note that, if external, the display devices 18 may be connected to the media devices 14 via audio/video receivers (not shown). In another embodiment, the media devices 14 and the display devices 18 are incorporated into a single device, in which case the display devices 18 may be connected to the media devices 14 via a bus or similar mechanism.

The media devices 14 have access to media content from one or more remote content sources 20 and/or one or more local content sources 22-1 through 22-N, which are also generally referred to herein as local content sources 22 or local content source 22. Note that while both remote content sources 20 and local content sources 22 are illustrated, it should be appreciated that, for any particular media device 14, the media device 14 may have access to media content from both the remote and local content sources 20 and 22, from only the one or more remote content sources 20, or from only the corresponding one or more local content sources 22. The one or more remote content sources 20 may generally be any source of media content that is remote from the locale 12 that provides media content to the media devices 14 via a dedicated network (e.g., a cable or satellite television service provider) or a public network such as the Internet (e.g., Hulu™, CBS.com, Netflix® streaming service, or the like). The local content sources 22 may be, for example, a repository of media content stored by the media devices 14, DVD drives of the media devices 14, Blu-ray drives of the media devices 14, or the like.

In operation, the media devices 14 obtain media content from the remote content sources 20 and the local content sources 22 and play the media content for presentation to users 24-1 through 24-M, which are also generally referred to herein as users 24 or user 24, via the display devices 18. In addition, some or all of the media devices 14 may be enabled to record media content from the remote content sources 20 and store the resulting recorded media content in the corresponding local content sources 22. For example, if the media device 14 is a DVR, the media device 14 may, in addition to playing media content from a television service provider (i.e., a remote content source 20), record media content from the television service provider. Still further, as discussed below in detail, in this embodiment, the media devices 14 are also enabled to transmit media content obtained from the remote content sources 20 and/or the local content sources 22 to other media devices 14 at the locale 12 via the LAN 16.

In this embodiment, the locale 12 also includes a media broker 26. While illustrated as a separate block for clarity and ease of discussion, the media broker 26 may be implemented as a separate device in the locale 12 or implemented as a software application on one of the media devices 14. In yet another embodiment, the functionality of the media broker 26 may be distributed among two or more of the media devices 14. As described below in detail, in this embodiment, the media broker 26 generally operates to provide two functions, namely, generation of an aggregate list of media content accessible to the media devices 14 in the locale 12 and monitoring and control of usage of media content at the media devices 14 in the locale 12.

With respect to monitoring and controlling usage of media content at the media devices 14 at the locale 12, the media broker 26 detects usage, or consumption, of media content by the users 24 that is potentially objectionable to an administrator 28 or that is otherwise of interest to the administrator 28. Note that while the administrator 28 in FIG. 1 is illustrated as being outside the locale 12, it should be appreciated that the administrator 28 is preferably a person, or user, that is often within the locale 12. Also, while only one administrator 28 is described herein, there may be multiple administrators 28 for the locale 12 where all of the administrators 28 are notified of detected usage, such as patterns, and enabled to block usage of media segments, as described below. In the preferred embodiment, the administrator 28 is a parent, and the users 24 are children of the administrator 28. In addition, the media broker 26 notifies the administrator 28 of detected usage of potentially objectionable media content or usage of media content that is otherwise of interest to the administrator 28. In this embodiment, the administrator 28 has a mobile device 30 such as, for example, a mobile smart phone (e.g., an Apple® iPhone®). A client 32 is hosted by the mobile device 30 and is preferably implemented in software. In this embodiment, the media broker 26 notifies the administrator 28 of the detected usage of media content of interest via the client 32 hosted on the mobile device 30 of the administrator 28. Communication between the media broker 26 and the mobile device 30 is provided over a network 34. The network 34 may be a distributed, public network such as, for example, the Internet, where the mobile device 30 preferably accesses the network 34 via a local wireless connection (e.g., a Wi-Fi connection) or a mobile communications network (e.g., 3G or 4G mobile communications network such as those utilized by AT&T®, Verizon®, and other mobile telecommunications and data service providers).

Upon being notified of the usage of media content of interest, the administrator 28 may choose to block usage (e.g., playback and/or recording) of the media content at the media devices 14 in the locale 12. In response, the media broker 26 blocks usage of the media content at the media devices 14 in the locale 12. In addition, the media broker 26 may identify similar media content that is accessible to the media devices 14 and enable the administrator 28 to also block the identified similar media content.

Before proceeding, some variations of the system 10 of FIG. 1 should be noted. In general, some or all of the media devices 14, the display devices 18, and the users 24 may be outside of the locale 12. More specifically, in one alternative embodiment, the system 10 may, in addition to or as an alternative to the display devices 18 illustrated in FIG. 1, include one or more display devices 18 that are outside of the locale 12 (e.g., an Apple® iPhone®). These display devices 18 that are outside the locale 12 are enabled to access media content from the media devices 14 located in the locale 12 via the network 34 and, optionally, the media broker 26 (e.g., stream media content from the media devices 14). Usage data defining usage of media content at these display devices 18 that are outside of the locale 12 is reported to the media broker 26 and used to detect usage, such as patterns, for which the administrator 28 is to be notified. In another alternative embodiment, one or more combined media/display device (e.g., an Apple® iPhone®) and its corresponding user may be outside of the locale 12 and still operate to provide usage data to the media broker 26 for use in detecting media content usage, such as patterns, for which the administrator 28 is to be notified.

Figure 2:
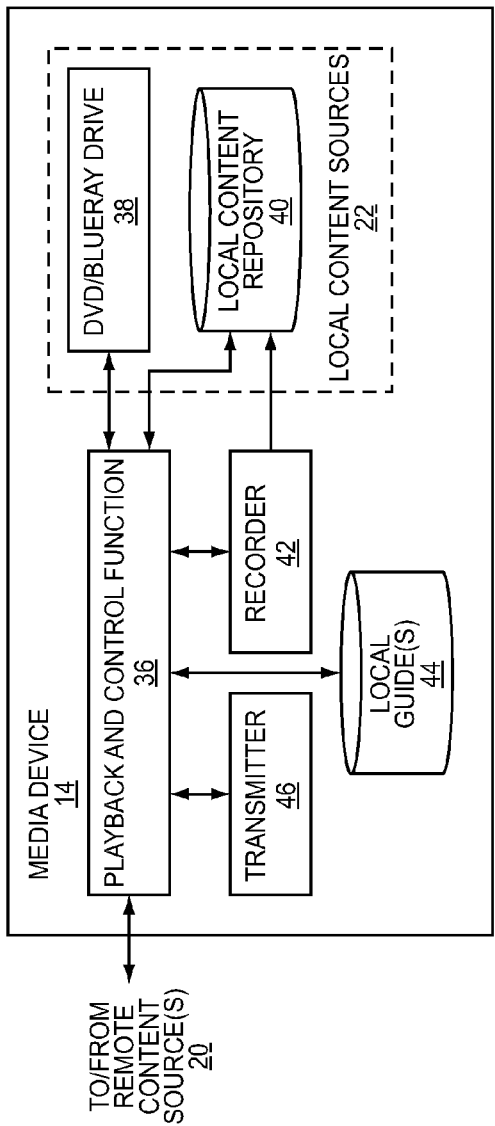
FIG. 2 is a functional block diagram of a media device in the system of FIG. 1 according to one embodiment of the present disclosure.

FIG. 2 is a functional block diagram of one of the media devices 14 of FIG. 1 according to one embodiment of the present disclosure. As illustrated, the media device 14 includes a playback and control function 36 which may be implemented in software, hardware, or a combination thereof depending on the particular implementation. In general, the playback and control function 36 operates to provide playback of media content from the one or more remote content sources 20 and/or the one or more local content sources 22. In this embodiment, the one or more local content sources 22 include a DVD or Bluray disc drive 38 and a local content repository 40. The local content repository 40 is a repository or collection of media content stored locally at the media device 14. In addition, as discussed below, the playback and control function 36 reports usage data to the media broker 26 regarding the usage of the media content accessible to the media device 14 by the users 24. In one embodiment, the usage data is data defining media segments of media content played by the media device 14 and presented to the users 24 via the associated display device 18.

In this embodiment, the media device 14 is capable of providing time-shifted playback of media content available from at least one of the one or more remote content sources 20. More specifically, in this embodiment, the media device 14 includes a recorder 42 that records media content from at least one of the one or more remote content sources 20 played and output by the playback and control function 36. For example, the media device 14 may be a DVR, or DVR equipped set-top box, in which case the users 24 are enabled to record media content received from a satellite or cable television service provider and played by the playback and control function 36. The recorded media content is stored in the local content repository 40 and is available for subsequent playback.

The media device 14 also includes one or more local guides 44 which generally store information identifying the media content accessible to the media device 14 from the one or more remote content sources 20 and the one or more local content sources 22. Note that the media content accessible to the media device 14 preferably includes media content currently available to the media device 14 from the remote and local content sources 20 and 22 as well as media content that will be available to the media device 14 from the one or more remote content sources 20 (e.g., television service providers) in the future.

In one embodiment, the one or more local guides 44 include a local guide for each of the remote and local content sources 20 and 22. For example, if one of the remote content sources 20 is a television service provider, the one or more local guides 44 may include an Electronic Programming Guide (EPG) provided by the television service provider that identifies media content currently accessible to the media device 14 from the television service provider and media content that will be accessible to the media device 14 from the television service provider in the future. Preferably, if the television service provider offers different subscription packages (e.g., basic cable, premium, etc.), the EPG either only identifies the media content within the subscription package available to the media device 14 or identifies all of the media content accessible from the television service provider along with flags or other markers that identify the media content that is within the subscription package available to the media device 14. As another example, if one of the remote content sources 20 is an Internet-based streaming media service (e.g., Hulu™, Netflix® streaming service, CBS.com, etc.), the one or more local guides 44 preferably include a listing of media content (e.g., list of movies, television programs, or the like) accessible to the media device 14 from the Internet-based streaming media service.

In a similar manner, for each local content source 22, the media device 14 preferably maintains corresponding local guides 44. For example, the media device 14 maintains a local guide 44 for the local content repository 40, which includes a list of media items stored in the local content repository 40. In addition to identifying the media content accessible to the media device 14 from the one or more remote content sources 20 and the one or more local content sources 22, the one or more local guides 44 may also include metadata describing the media content accessible from the corresponding remote and local content sources 20 and 22. The metadata may be obtained from the corresponding remote and local content sources 20 and 22; obtained from one or more remote, third-party metadata sources (e.g., one or more Internet-based services); or a combination thereof.

Lastly, in this embodiment, the media device 14 includes a transmitter 46, which may be implemented in software, hardware, or a combination thereof. In general, the transmitter 46 operates to transmit media content played and output by the playback and control function 36 to the other media devices 14 in the locale 12 via the LAN 16. As discussed below, because the media devices 14 in the locale 12 typically will have access to different media content, the transmitters 46 of the media devices 14 in the locale 12 enable the user(s) 24 of the media devices 14 to use, or consume, not only the media content accessible to the media device 14 but also the media content accessible to the other media devices 14 in the locale 12.

Figure 3:
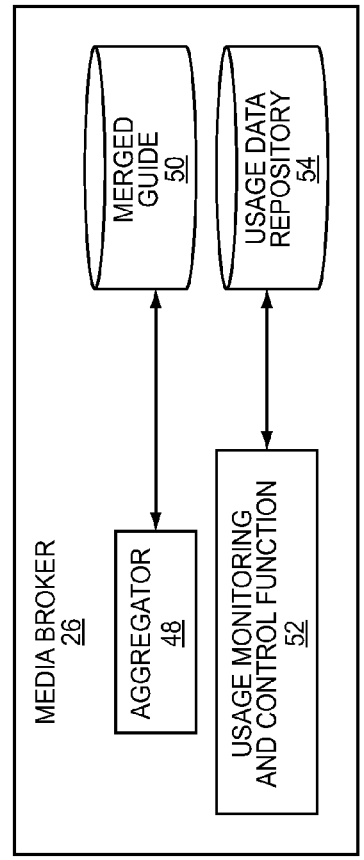
FIG. 3 is a functional block diagram of the media broker in the system of FIG. 1 according to one embodiment of the present disclosure.

FIG. 3 is a functional block diagram of the media broker 26 of FIG. 1 according to one embodiment of the present disclosure. As illustrated, the media broker 26 includes an aggregator 48, which may be implemented in software, hardware, or a combination thereof. As discussed below in detail, the aggregator 48 operates to obtain the local guides 44 from the media devices 14 that identify the media content accessible to the media devices 14 in the locale 12. The aggregator 48 aggregates the local guides 44 to provide an aggregate list of the media content accessible to the media devices 14, which in this particular embodiment is a merged guide 50. The merged guide 50 identifies the media content accessible to all of the media devices 14 in the locale 12. In addition, the merged guide 50 may include metadata describing the media content accessible to all of the media devices 14 in the locale 12. Alternatively, the aggregator 48 may store the local guides 44 separately and utilize the separate local guides 44.

In addition, the media broker 26 includes a usage monitoring and control function 52, which may also be implemented in software, hardware, or a combination thereof. As discussed below in detail, the usage monitoring and control function 52 operates to obtain usage data from the media devices 14 regarding usage, or consumption, of media content at the media devices 14 by the users 24. The usage monitoring and control function 52 stores the usage data in a usage data repository 54 and processes the usage data to detect patterns of usage by the users 24 that are indicative of usage, or consumption, of media content that of interest to the administrator 28. In addition, the usage monitoring and control function 52 notifies the administrator 28 of the detected patterns such that the administrator 28 is enabled to block usage (e.g., playback and/or recording) of the detected patterns or individual media segments in the detected pattern at the media devices 14. For detected patterns or individual media segments that the administrator 28 chooses to block, the usage monitoring and control function 52 may also analyze the merged guide 50 to identify additional media segments that are similar to the blocked pattern or blocked media segment(s), notify the administrator 28 of the additional media segments such that the administrator 28 is enabled to choose to block one or more of the additional media segments, and block usage of the one or more of the additional media segments that the administrator 28 has chosen to block at the media devices 14. In an alternative embodiment, the usage monitoring and control function 52 may analyze the local guides 44 of the media devices 14, rather than the merged guide 50, to identify the additional media segments that are similar to the blocked pattern or blocked media segment(s).

Figure 4:
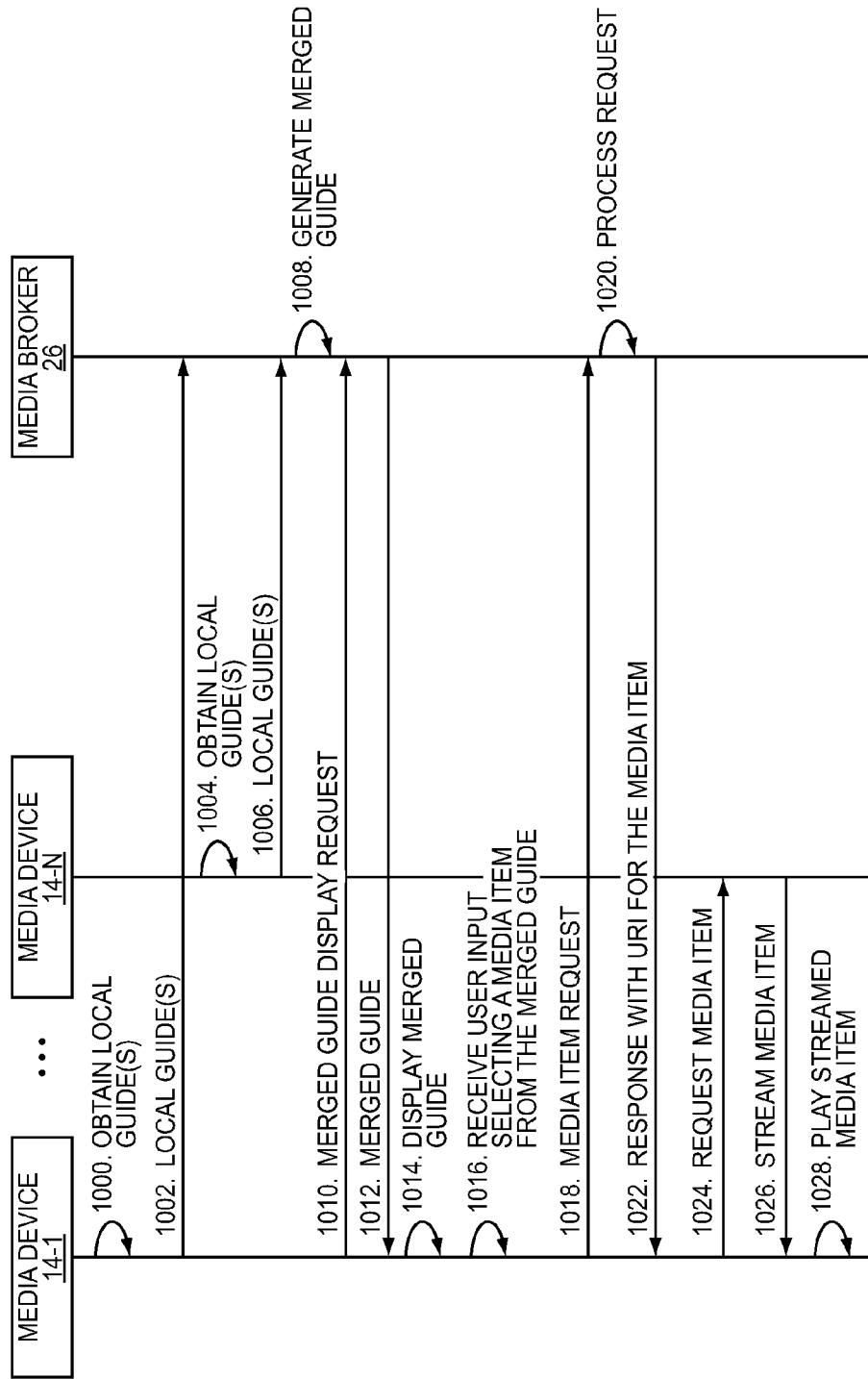
FIG. 4 illustrates the operation of the media broker of FIG. 1 to generate and use a merged guide that identifies media content accessible to all of the media devices in the locale according to one embodiment of the present disclosure.

FIG. 4 illustrates the operation of the media broker 26 to generate and utilize the merged guide 50 according to one embodiment of the present disclosure. First, the playback and control functions 36 of the media devices 14 obtain the local guides 44 identifying the media content accessible to the media devices 14 from the remote and local content sources 20 and 22 and send the local guides 44 to the media broker 26 (steps 1000-1006). Note that the playback and control functions 36 of the media devices 14 send updates for the local guides 44 to the media broker 26 over time as the media content accessible to the media devices 14 from the remote and local content sources 20 and 22 changes or more or less remote and/or local content sources 20 and 22 are available to the media devices 14. Next, the aggregator 48 of the media broker 26 generates the merged guide 50 by combining or merging the local guides 44 from the media devices 14 (step 1008).

In this embodiment, the media broker 26 utilizes the merged guide 50 to enable the users 24 to utilize media content accessible to any of the media devices 14 at any of the other media devices 14 in the locale 12. More specifically, in this example, the playback and control function 36 of the media device 14-1 sends a merged guide display request to the media broker 26 (step 1010). In this embodiment, the merged guide display request is sent by the playback and control function 36 of the media device 14-1 in response to user input from one of the users 14-1 and 24-2 requesting display of the merged guide 50 on the display device 18-1. For example, the user input may be received from a remote control device (not shown) in response to actuation of a corresponding button by one of the users 24-1 and 24-2 on the remote control device.

In response to the merged guide display request, the aggregator 48 of the media broker 26 returns the merged guide 50, or a relevant portion thereof, to the media device 14-1 (step 1012). The playback and control function 36 of the media device 14-1 then displays the merged guide 50 to the users 24-1 and 24-2 via the display device 18-1 (step 1014). The playback and control function 36 then receives user input from one of the users 24-1 and 24-2 selecting a media item from the merged guide 50 (step 1016). In response, the playback and control function 36 of the media device 14-1 sends a media item request for the selected media item to the media broker 26 (step 1018).

The aggregator 48 of the media broker 26 then processes the media item request to determine the media device 14 from which the selected media item is accessible (step 1020). The aggregator 48 then returns a response with a Uniform Resource Indicator (URI) or similar reference to the selected media item at the media device 14 at which the selected media item is accessible (step 1022). In this embodiment, the selected media item is accessible to the media device 14-N. Thus, using the URI for the selected media item, the playback and control function 36 of the media device 14-1 sends a request to the media device 14-N for the selected media item (step 1024). In response, the playback and control function 36 of the media device 14-N obtains the selected media item from the corresponding remote or local content source 20 or 22 and outputs the selected media item to the transmitter 46 of the media device 14-N, which then streams the selected media item to the media device 14-1 (step 1026). The playback and control function 36 of the media device 14-1 then receives and plays the stream of the selected media item from the media device 14-N such that the selected media item is displayed to the users 24-1 and 24-2 via the display device 18-1 (step 1028).

Figure 5A:
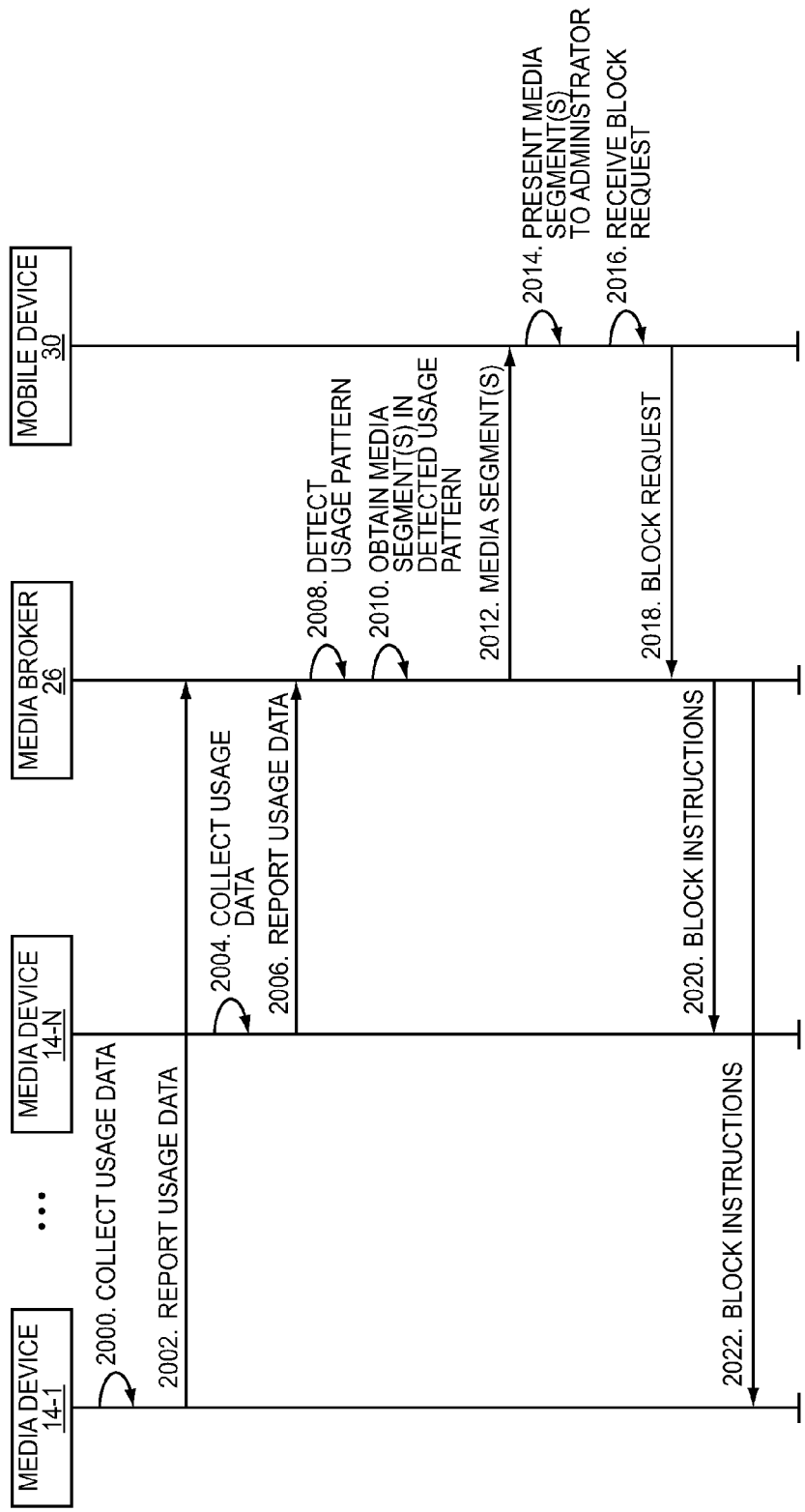
FIGS. 5A and 5B illustrate the operation of the media broker of FIG. 1 to monitor and control usage of the media content accessible to the media devices in the locale according to one embodiment of the present disclosure.
Figure 5B:
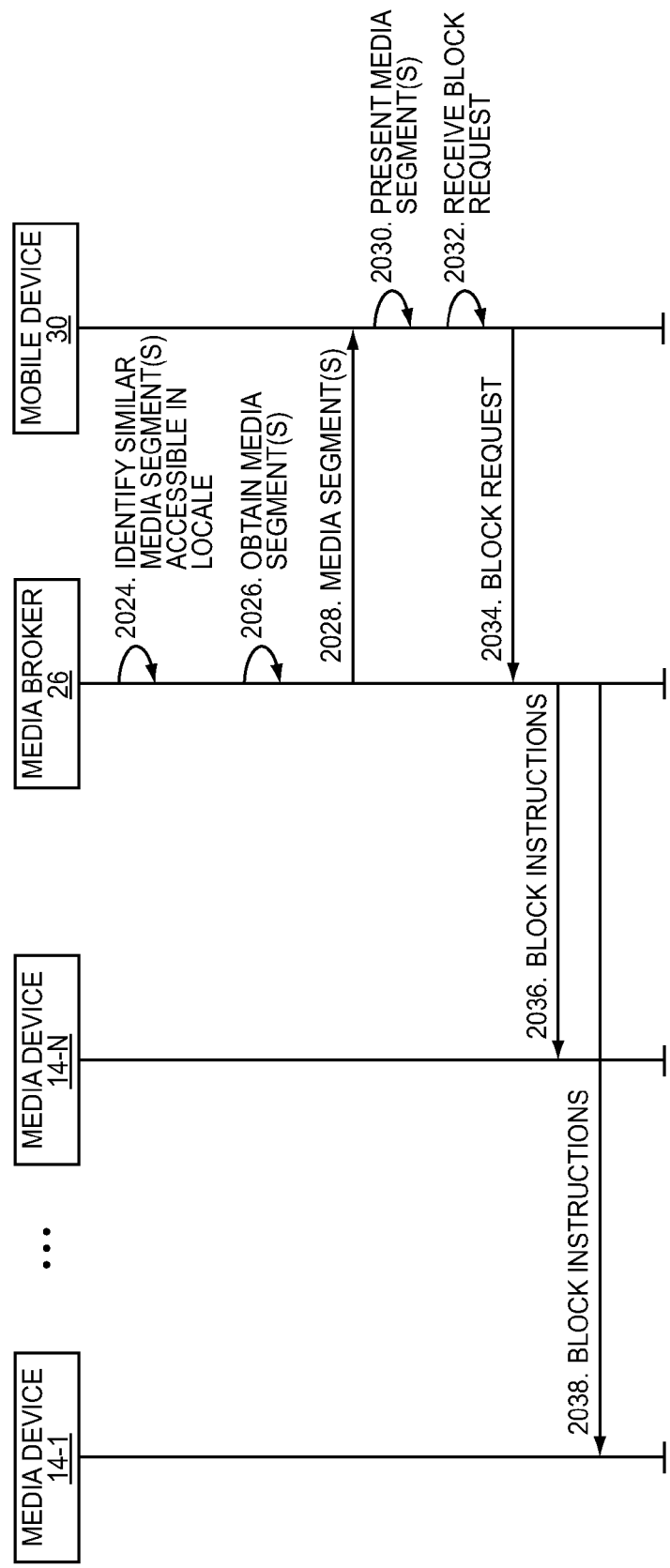

FIGS. 5A and 58 illustrate the operation of the media broker 26 to monitor and control usage of media content at the media devices 14 in the locale 12 according to one embodiment of the present disclosure. First, the playback and control functions 36 of the media devices 14 collect usage data and report the usage data to the media broker 26 (steps 2000-2006). More specifically, for each of the media devices 14, the usage data collected by the playback and control function 36 of the media device 14 preferably includes usage data for media segments defined for the media content accessible to the media device 14. A media segment is a segment of a media item (e.g., a movie, a television program, a video clip, etc.) included in the media content accessible to the media device 14. Further, for each media segment, the usage data collected by the playback and control function 36 of the media device 14 includes a total number of playbacks of the media segment by the media device 14 for all of the users 24, a number of playbacks of the media segment by the media device 14 for each of the users 24 individually, or both. Where usage data is collected for the users 24 individually, the media devices 14 or the display devices 18 include features that enable identification of the users 24 that are currently viewing media content played by the media devices 14. For example, the users 24 may be identified via user log-in, facial recognition, mobile device proximity, voice recognition, or the like.

In one embodiment, each media device 14 logically divides the media content accessible to the media device 14 into media segments each having a predetermined length (e.g., 2 minutes). The predetermined length may be fixed or variable depending on the particular implementation. More specifically, for media content that is streamed to the media device 14 from one or more of the remote content sources 20 (e.g., a television program received from a television service provider, streaming media items from an Internet-based streaming content provider, or the like), the playback and control function 36 may logically divide each media item (e.g., each television program, movie, etc.) into a number of media segments as the media item is received for playback and/or storage. The playback and control function 36 may then store information defining the media segments (e.g., start and stop points) of the media items such that the playback and control function 36 can collect usage data (e.g., number of playbacks for each of the users 24) for each of the media segments.

Further, rather than starting the media segments at arbitrary points in playback of the corresponding media items, the media segments for the media items may start at predefined absolute start times or predefined offsets from the beginning of the corresponding media items. More specifically, for an episode of Survivor received by the media device 14 from a television service provider, the episode of Survivor may be logically divided into media segments starting at predefined absolute times such as, for example, 8:00 PM, 8:02 PM, 8:04 PM, etc. Alternatively, the episode of Survivor may be logically divided into media segments at predefined relative times offset from the beginning of the episode of Survivor such as, for example, start plus 0 minutes, start plus 2 minutes, start plus 4 minutes, etc.

For the media content from the one or more local content sources 22, each media item may be logically divided into a number of media segments the first time the media item is played by the playback and control function 36. The playback and control function 36 may store information defining the media segments (e.g., start and stop points) of the media items and collect usage data (e.g., number of playbacks for each of the users 24) for each of the media segments. Further, rather than starting the media segments at arbitrary points in playback of the corresponding media items, the media segments for the media items may start at predefined offsets from the beginning of the corresponding media items. More specifically, a movie downloaded and stored in the local content repository 40 may be logically divided into a number of media segments at predefined relative time offsets from the beginning of the movie such as, for example, start plus 0 minutes, start plus 2 minutes, start plus 4 minutes, etc.

In another embodiment, the media devices 14 logically divide media content into media segments dynamically in response to replay actions requested by the users 24. For example, when the user 24 replays a portion of a media item, the playback and control function 36 may define a corresponding media segment for the media item. More specifically, if the user 24 is watching an episode of Survivor and rewinds playback of the episode 3 minutes to re-watch a corresponding portion of the episode, the playback and control function 36 may define a media segment for the episode for that 3 minute portion of the episode that was replayed by the user 24. The playback and control function 36 then stores information defining the media segment and subsequently monitors usage of the media segment by the user 24. For instance, the playback and control function 36 may subsequently detect that the user 24 again rewinds playback of the same episode of Survivor during the same or a subsequent playback of the episode to again watch that media segment. In response, the playback and control function 36 updates the usage data stored for the media segment accordingly.

In yet another embodiment, the media segments of the media content are defined by metadata obtained by the media devices 14 for the media content. With respect to media content obtained from the one or more remote content sources 20, the metadata defining the media segments may be obtained from the one or more remote content sources 20 in association with the media content or obtained from a third-party metadata source. For example, the metadata defining the media segments of the media content may be provided by the one or more remote content sources 20 according to the MPEG-7 standard. In a similar manner, metadata defining the media segments of the media content accessible from the one or more local content sources 22 may be included in the corresponding media files as metadata. Alternatively, the metadata defining the media segments of the media content accessible from the one or more local content sources 22 may be obtained from a remote third-party service and stored in association with the corresponding media files.

In yet another embodiment, the media segments of the media content are identified using known video and/or audio processing techniques for performing scene or shot detection. Each scene may be identified as a different media segment. In yet another embodiment, the media content accessible from one or more of the remote and local content sources 20 and 22 may have predefined segments. In this case, the media devices 14 may utilize the predefined segments as the media segments for which the playback and control functions 36 collect usage data. For example, the chapters predefined for movies stored on DVDs may be used as the media segments for the movies for which the playback and control functions 36 collect usage data.

Once the usage data is collected and reported to the media broker 26, the usage monitoring and control function 52 of the media broker 26 processes the usage data reported by the media devices 14 to detect a pattern of usage that indicates that one of the users 24 is using, or consuming, media content that is of interest to the administrator 28 (step 2008). As used herein, a pattern is preferably a set of two or more media segments satisfying: (1) one or more defined criteria indicating that the two or more media segments are related and (2) one or more defined criteria regarding usage by one of the users 24. In order to detect the pattern, the usage data reported by the media devices 14 is processed using one or more predefined pattern detection rules. The one or more predefined pattern detection rules may include one or more system-defined pattern detection rules, one or more user-configurable pattern detection rules defined by the administrator 28, or a combination thereof. Further, the predefined pattern detection rules may be specific for a particular user 24 or group of the users 24. Preferably, each of the predefined pattern detection rules includes at least one criterion for determining whether media segments are related and at least one criterion regarding usage of the related media segments. When the predefined pattern detection rules are satisfied by a number of media segments (preferably two or more media segments), the media segments that satisfy the predefined pattern detection rules are detected as a pattern.

With respect to the predefined pattern detection rules, the at least one criterion for determining whether media segments are related may be based on metadata describing the media items of which the media segments are a part (e.g., media item name, actors or actresses, television station, time of broadcast or delivery, MPAA rating, or the like), metadata describing the content of the media segments (e.g., violence, adult language, adult situations, MPAA rating, or the like), or contextual information regarding a context in which media segments are consumed by the user 24 (e.g., time of day, other proximate users, or the like). The at least one criterion regarding usage of the related media segments may include at least one criterion defining a threshold amount of usage of the related media segments (e.g., a threshold number of usages or a threshold frequency of usage such as five times in a 30 minute period). In addition or alternatively, the at least one criterion regarding the usage of the related media segments may include at least one criterion requiring that usage of the related media segments is indicative of a new pattern of usage (e.g., usage of the related media segments is different than how the user has historically used the same and/or similar media segments).

As an example, a predefined pattern detection rule may state that a pattern is to be detected when at least two media segments of the same or different episodes of a television show are consumed by a user at least five times each. As another example, a predefined pattern detection rule may state that a pattern is to be detected when at least two media segments viewed during a defined time period of the same or different days (e.g., 10:00 PM-11:00 PM) are consumed by a user at least five times each. As yet another example, a predefined pattern detection rule may state that a pattern is to be detected when at least two media segments from media items having a PG-13 rating are consumed by the user at least five times each.

As another example, a predefined pattern detection rule may state that a pattern is to be detected when at least two media segments containing violence have been consumed by a user at least five times each. As another example, a predefined pattern detection rule may state that a pattern is to be detected when two or more media segments containing an adult situation have been consumed by a user at least a total of two times (e.g., total users for all of the media segments combined is at least two). As yet another example, a predefined pattern detection rule may state that a pattern is to be detected when at least two media segments containing adult situations have been consumed by a user at least twice each and a total, or combined, number of times that the at least two media segments have been consumed by the user is at least ten.

As another example, a predefined pattern detection rule may state that a pattern is to be detected when usage data for at least two related media segments indicates that the user 24 has changed usage patterns for the at least two related media segments. The at least two related media segments may be related based on media item metadata (e.g., the same media item or similar media item), based on metadata describing the content of the media segments (e.g., similar content—violence, etc.), or based on contextual data (e.g., used during the same time period during the day). More specifically, a predefined pattern detection rule may state that a pattern is to be detected when the user has consumed two media segments having similar content at least three times each when the user has historically consumed the same or similar media segments only once. As another example, a predefined pattern detection rule may state that a pattern is to be detected when the user has consumed two media segments at least three time during a particular time period during the day when the user has previously consumed the same or other media segments only once during the same time period during the day.

As discussed above, in some embodiments, metadata is used to detect patterns. Note, however, that metadata is not required for pattern detection (e.g., pattern detection may be based on contextual data). If metadata is to be used for pattern detection, metadata describing the media items of which the media segments are a part may be, for example, obtained from the corresponding remote and local content sources 20 and 22 and provided to the media broker 26, obtained by the media devices 14 from a third-party service via the network 34 and provided to the media broker 26, or obtained by the media broker 26 from a third-party service via the network 34. In one embodiment, the metadata describing a media item may include a title or name of the media item, actors or actresses appearing in the media item, a television station that broadcast or otherwise delivered the media item, a time at which the media item was broadcast on a television station, an MPAA or similar rating of the media item, a textual description of the media item such as that provided in the EPGs provided by traditional television service providers, or the like.

In a similar manner, metadata describing the content of the media segments may be, for example, obtained by the media devices 14 from the corresponding remote and local content sources 20 and 22 and provided to the media broker 26, obtained by the media devices 14 from a third-party service via the network 34 and provided to the media broker 26, obtained by the media devices 14 through audio/visual analysis of the media content (e.g., audio to text conversion to detect objectionable language, audio and/or video analysis to detect explosions for violent content, or the like) and then provided to the media broker 26, or obtained by the media broker 26 from a third-party service via the network 34. In one embodiment, the metadata describing the content of a media segment may include one or more keywords describing a nature of the content of the media segment such as, for example, violence, adult situations, crude language, nudity, or the like; a rating such as, for example, G, PG, PG-13, R, or the like; a textual description of the content of the media segment which may be analyzed to extract keywords or otherwise determine the nature of the content of the media segment; sub-titles or closed-captions for the media segment which may be analyzed to extract keywords or otherwise determine the nature of the content of the media segment; or the like.

Before proceeding, it should be noted that while a pattern preferably includes two or more media segments, the present disclosure is not limited thereto. In another embodiment, patterns may be detected for one or more media segments. More specifically, in this alternative embodiment, a pattern detection rule may include one or more criteria regarding usage of a media segment by a user (e.g., threshold number of uses, usage indicates a new pattern of usage that is a deviation from the user's previous pattern of usage for the same or similar media segments, or the like). In addition, the pattern detection rule may include one or more criteria regarding the media item of which the segment is a part (e.g., requisite MPAA rating), one or more criteria regarding the content of the media segment (e.g., media segment contains violence), or one or more criteria regarding a context in which the media segment has been consumed by the user (e.g., consumed after 10:00 PM).

Once a pattern has been detected, the usage monitoring and control function 52 of the media broker 26 obtains the media segments in the pattern (step 2010). In general, the usage monitoring and control function 52 may obtain the media segments using any suitable technique. In one embodiment, the usage monitoring and control function 52 obtains the media segments in the pattern from the media devices 14 that have access to the corresponding media content from the remote and local content sources 20 and 22. More specifically, for broadcast television content from a television service provider or similar streaming media content that is not provided on-demand, the media devices 14 may temporarily store the broadcast media content after playback such that the media content is available if the media broker 26 subsequently needs a media segment from the broadcast media content. For on-demand media content such as that provided by some television service providers and Internet-based streaming media content services (e.g., Hulu™, CBS.com, Netflix® streaming service, or the like), the media devices 14 may obtain the media segments from the corresponding remote content source(s) 20 as requested by the media broker 26. For media content from the one or more local content sources 22, the media devices 14 may extract the media segments from the corresponding media content as requested by the media broker 26. Note that if the media segments cannot be extracted, the media segments may be obtained from alternative sources such as, for example, Hulu™, YouTube®, or the like. In another embodiment, for media segments from media content from the one or more remote content sources 20 of the media devices 14, the usage monitoring and control function 52 of the media broker 26 may obtain the media segments in the pattern directly from the one or more remote content sources 20.

Next, the usage monitoring and control function 52 provides the media segments in the pattern to the mobile device 30 via the network 34 for review by the administrator 28 (step 2012). Note that while in this exemplary embodiment the media segments are provided to the administrator 28 for review at the mobile device 30, the present disclosure is not limited thereto. The media segments may be provided to the administrator 28 for review using any suitable technology.

For example, in another embodiment, the media broker 26 provides the media segments in the pattern to the administrator 28 for review via one or more of the media devices 14 when the administrator 28 is within the locale 12.

When providing the media segments in the pattern to the mobile device 30, the usage monitoring and control function 52 may push the media segments to the mobile device 30 such that the media segments are stored at the mobile device 30 and are available for review by the administrator 28. Alternatively, the usage monitoring and control function 52 may first notify the mobile device 30 of the media segments in the pattern. The client 32 of the mobile device 30 may then obtain the media segments from the media broker 26 upon request by the administrator 28. For example, the media broker 26 may stream the media segments to the mobile device 30 upon request by the administrator 28.

While in this embodiment the media broker 26 provides the media segments in the pattern to the mobile device 30 of the administrator 28 for review, the present disclosure is not limited thereto. In another embodiment, rather than providing the media segments in the pattern to the mobile device 30, the media broker 26 may provide references (e.g., URIs or Uniform Resource Locators (URLs)) to the media segments at one or more sources of the corresponding media content such as, for example, the remote content sources 20. The mobile device 30 may then obtain the media segments from the corresponding source(s) using the references provided by the media broker 26.

Next, the client 32 of the mobile device 30 presents the media segments in the pattern detected by the media broker 26 to the administrator 28 (step 2014). At this point, it should be noted that while in this exemplary embodiment the media segments are provided to the administrator 28 for review, the present disclosure is not limited thereto. Alternatively, metadata describing the content of the media segments in the pattern, rather than the media segments themselves, may be provided to the administrator 28 for review. This may be true for all of the media segments in the pattern or only a subset of the media segments in the pattern. Providing metadata describing the content of the media segments rather than the media segments themselves may be particularly beneficial in implementations or embodiments where some or all of the media segments in the pattern are unavailable. The media segments in the pattern may be unavailable when, for example, copyright restrictions prevent extraction and redistribution of the media segments, the corresponding media content is not stored at the media devices 14 and/or the media broker 26 and not available from other available content sources such that extraction of the media segments cannot be performed, or the like.

Upon reviewing the media segments, the administrator 28 may choose to block the pattern or block one or more of the individual media segments in the pattern if desired. In this embodiment, the administrator 28 chooses to block the pattern and, as such, the client 32 of the mobile device 30 receives a block request from the administrator 28 indicating that the administrator 28 desires to block the pattern (step 2016). The block request may also include data indicating one or more reasons that the administrator 28 chose to block the pattern. For example, in one embodiment, one or more keywords describing the content of the media segments may be provided and presented to the administrator 28. The administrator 28 may then select one or more of those keywords as the reason(s) that the administrator 28 chose to block the pattern. The administrator 28 may also be enabled to add additional keywords as reasons that the administrator 28 chose to block the pattern. The client 32 of the mobile device 30 then sends the block request to the media broker 26 (step 2018).

In response to the block request, the usage monitoring and control function 52 of the media broker 26 sends block instructions to the media devices 14 in the locale 12 to block the media segments in the pattern (steps 2020 and 2022). Thereafter, the playback and control functions 36 of the media devices 14 block usage of the media segments in the pattern. For example, the playback and control functions 36 may automatically skip over the media segments during playback of the corresponding media items, replace the media segments with predefined replacement content (e.g., a blue screen with a message indicating that the media segment has been blocked, a different version of the media segment such as a version having a different MPAA rating, or the like), or edit the media segments to remove objectionable content (e.g., beep out or mute objectionable language). The media segments may be blocked for all of the users 24 or for only the user 24 for which the pattern was detected. If blocking is to be performed only for the user 24 for which the pattern was detected, the media devices 14 or the display devices 18 may include features that enable identification of the users 24 that are currently viewing media content played by the media devices 14. For example, the users 24 may be identified via facial recognition, user log-in, or the like.

Before proceeding, an alternative embodiment should be discussed. In this embodiment, the administrator 28 has chosen to block the pattern detected by the media broker 26. As a result, usage of all of the media segments in the pattern is blocked at the media devices 14. However, in an alternative embodiment, the administrator 28 may be enabled to choose one or more of the media segments in the pattern to block on an individual basis. In response, the usage monitoring and control function 52 then blocks usage of the media segments selected to be blocked by the administrator 28 rather than all of the media segments in the pattern. The usage monitoring and control function 52 may block usage of the media segments selected to be blocked by the administrator 28 by, for example, sending corresponding block instructions to all of the media devices 14 or only those media devices 14 having access to the media segments to be blocked.

Also, while the discussion herein focuses on detecting patterns of usage, the present disclosure is not limited thereto. In another embodiment, the usage monitoring and control function 52 may notify the administrator 28 when a particular media segment has been used more than a predefined threshold amount by one of the users 24 or by all of the users 24. For the notification, the administrator 28 may be provided with the media segment or metadata describing content of the media segment. The administrator 28 may then review the media segment or the metadata describing the content of the media segment and choose whether to block the media segment. If the administrator 28 chooses to block the media segment, a corresponding block request is sent to the media broker 26, and the media broker 26 sends a corresponding block instruction to the media devices 14 in the locale 12 or the specific media device 14 having access to the corresponding media content.

Next, as illustrated in FIG. 58, in addition to blocking the media segments in the pattern, the usage monitoring and control function 52 of the media broker 26 identifies additional media segments in the media content accessible to the media devices 14 that are similar to the media segments in the blocked pattern (step 2024). More specifically, the media content accessible to the media devices 14 is logically segmented into media segments, and the media broker 26 obtains metadata describing the content of the media segments from the media devices 14, the remote content sources 20, or a third-party service and stores the metadata in the merged guide 50, as described above. The usage monitoring and control function 52 may then identify the additional media segments that are similar to the media segments in the blocked pattern by analyzing the metadata describing the content of the media segments of the media content accessible to the media devices 14 with respect to the metadata describing the content of the media segments in the blocked pattern and, in some embodiments, data defining the reason(s) that the administrator 28 chose to block the pattern.

In one embodiment, the additional media segments are additional media segments in the media content accessible to the media devices 14 having metadata describing the content of the additional media segments that matches the metadata describing the content of the media segments in the blocked pattern to at least a predefined threshold degree. The predefined threshold degree may be, for example, a predefined threshold number of matches between the metadata describing the content of the media segments in the blocked pattern and the metadata describing the content of the additional media segments. In another embodiment, one or more keywords common among the metadata describing the content of the media segments in the blocked pattern are selected as the reason(s) that the administrator 28 chose to block the pattern. In this case, the additional media segments may be additional media segments from the media content accessible to the media devices 14 having metadata describing the content of the additional media segments that includes at least one or alternatively all of the one or more keywords selected as the reason(s) that the administrator 28 chose to block the pattern.

Next, the usage monitoring and control function 52 of the media broker 26 obtains the additional media segments identified as being similar to the media segments in the blocked pattern (step 2026). In general, the usage monitoring and control function 52 may obtain the additional media segments using any suitable technique. In one embodiment, the usage monitoring and control function 52 obtains the additional media segments from the media devices 14 that have access to the corresponding media content from the remote and local content sources 20 and 22 in a manner similar to that described above with respect to step 2010. Alternatively, if the media segments are segments of media content accessible from the remote content sources 20, the usage monitoring and control function 52 may obtain the media segments directly from the remote content sources 20.

The usage monitoring and control function 52 then provides the additional media segments to the mobile device 30 for review by the administrator 28 (step 2028). Note that while in this exemplary embodiment the additional media segments are provided to the administrator 28 for review at the mobile device 30 of the administrator 28, the present disclosure is not limited thereto. The additional media segments may be provided to the administrator 28 for review using any suitable technology. For example, in another embodiment, the media broker 26 provides the additional media segments to the administrator 28 for review via one or more of the media devices 14 when the administrator 28 is within the locale 12.

When providing the additional media segments to the mobile device 30, the usage monitoring and control function 52 may push the additional media segments to the mobile device 30 such that the media segments are stored at the mobile device 30 and are available for review by the administrator 28. Alternatively, the usage monitoring and control function 52 may first notify the mobile device 30 of the additional media segments. The client 32 of the mobile device 30 may then obtain the additional media segments from the media broker 26 upon request by the administrator 28. For example, the media broker 26 may stream the additional media segments to the mobile device 30 upon request by the administrator 28.

While in this embodiment the media broker 26 provides the additional media segments to the mobile device 30 of the administrator 28 for review, the present disclosure is not limited thereto. In another embodiment, rather than providing the additional media segments in the pattern to the mobile device 30, the media broker 26 may provide references (e.g., URIs or URLs) to the additional media segments at one or more sources of the corresponding media content such as, for example, the remote content sources 20. The mobile device 30 may then obtain the additional media segments from the corresponding source(s) using the references provided by the media broker 26.

Next, the client 32 of the mobile device 30 presents the additional media segments to the administrator 28 (step 2030). At this point, it should be noted that while in this exemplary embodiment the additional media segments are provided to the administrator 28 for review, the present disclosure is not limited thereto. Alternatively, metadata describing the content of the additional media segments, rather than the additional media segments themselves, may be provided to the administrator 28 for review. This may be true for all of the additional media segments or only a subset of the additional media segments. Providing metadata describing the content of the additional media segments rather than the additional media segments themselves may be particularly beneficial in implementations or embodiments where some or all of the additional media segments are unavailable.

Upon reviewing the additional media segments, the administrator 28 may choose to block one or more of the additional media segments. In this embodiment, the administrator 28 chooses to block one or more of the additional media segments. As such, the client 32 receives a block request from the administrator 28 indicating that the administrator 28 desires to block one or more of the select media segments from the additional media segments provided by the media broker 26 (step 2032). The client 32 of the mobile device 30 then sends the block request to the media broker 26 (step 2034).

In response to the block request, the usage monitoring and control function 52 of the media broker 26 sends block instructions to the media devices 14 in the locale 12 to block usage of the select media segments identified in the block request (steps 2036 and 2038). Thereafter, the playback and control functions 36 of the media devices 14 block usage (e.g., playback and/or recording) of the select media segments. For example, the playback and control functions 36 may automatically skip over the select media segments during playback of the corresponding media items, replace the select media segments with predefined replacement content (e.g., a blue screen with a message indicating that the media segment has been blocked), or edit the select media segments to remove objectionable content (e.g., beep out or mute objectionable language). The select media segments may be blocked for all of the users 24 or for only the user 24 for which the pattern was detected in step 2008. At this point, the process repeats itself such that the usage monitoring and control function 52 continues to monitor usage of media content at the media devices 14 to detect patterns of usage that are indicative of the users 24 using, or consuming, media content of interest to the administrator 28, provide the media segments in the detected patterns to the administrator 28 for review, and process block requests initiated by the administrator 28 upon reviewing the media segments as described above.

Figure 6:
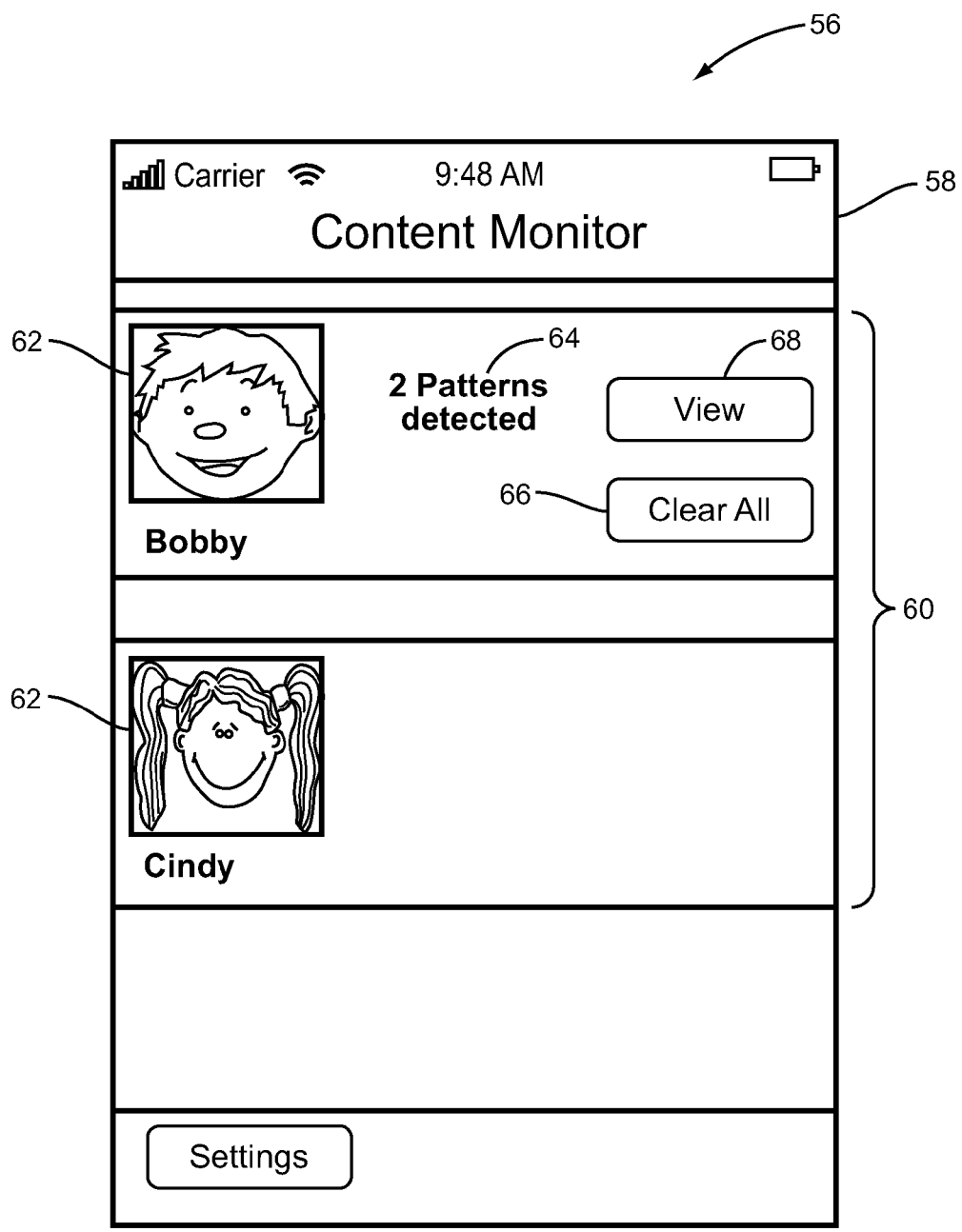
FIGS. 6 through 8 illustrate an exemplary Graphical User Interface (GUI) for presenting a detected pattern of media content usage to the administrator according to one embodiment of the present disclosure.
Figure 7:
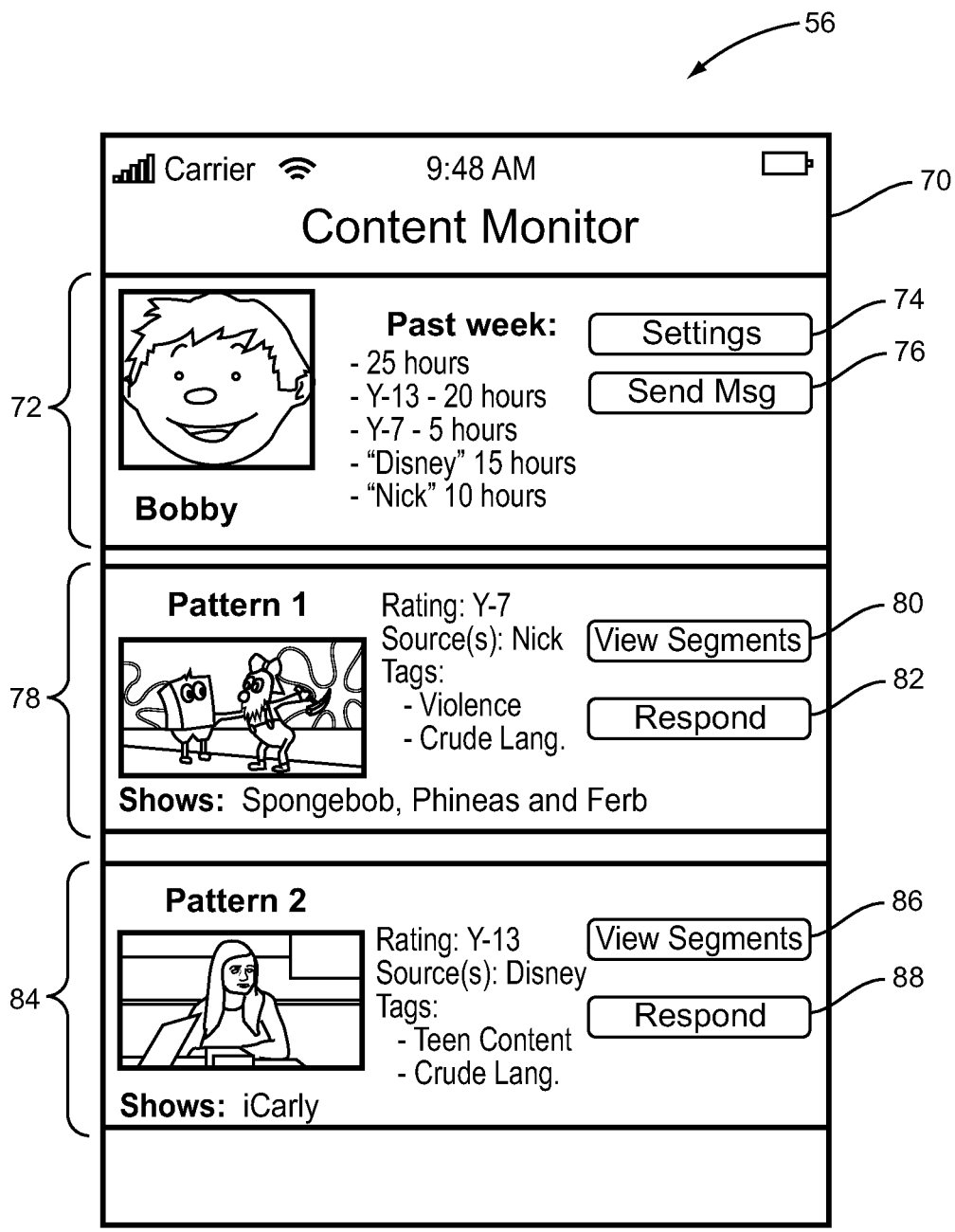
Figure 8:
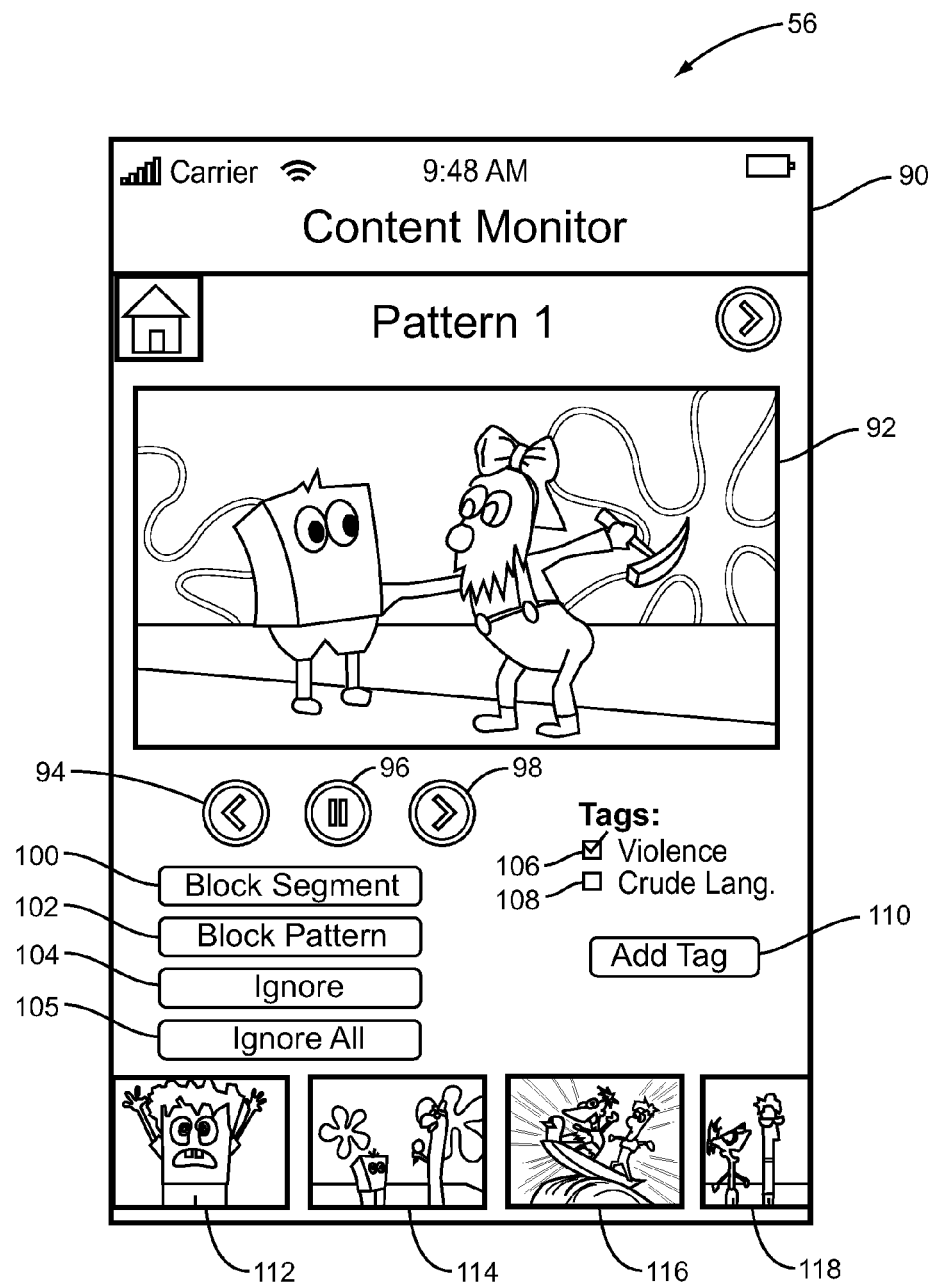

FIGS. 6 through 8 illustrate an exemplary Graphical User Interface (GUI) 56 that may be provided to enable the administrator 28 to review media segments in one or more patterns detected by the media broker 26 and choose to block the patterns or individual media segments within the patterns according to one embodiment of the present disclosure. In this particular embodiment, the GUI 56 is provided by the client 32 operating on the mobile device 30. As illustrated in FIG. 6, the GUI 56 includes a home screen 58 that includes a user list 60. The user list 60 includes user identifiers 62 for the users 24 for which usage data is being collected and monitored. In this example, the users 24 are "Bobby" and "Cindy." In this example, the media broker 26 has detected two patterns in the usage of the media content accessible to the media devices 14 in the locale 12 by "Bobby" and has notified the client 32. As such, the home screen 58 also includes information 64 indicating that two patterns have been detected for "Bobby." The home screen 58 also includes a Clear All button 66 and a View button 68. The Clear All button 66, when actuated by the administrator 28, causes the client 32 to clear the two detected patterns from the client 32. This would typically be done after the administrator 28 has reviewed the patterns and blocked the patterns or individual media segments in the patterns as desired.

The View button 68, when actuated by the administrator 28, causes the client 32 to update the GUI 56 to present a user screen 70 as illustrated in FIG. 7. The user screen 70 includes a user information area 72 that includes information about "Bobby" such as, for example, a summary of media content usage by "Bobby" over the past week. This summary information may be generated by the media broker 26 based on the usage data collected for "Bobby" and provided to the client 32. The user information area 72 also includes a Settings button 74 that may be actuated by the administrator 28 to adjust settings such as, for example, one or more user specific pattern detection rules defined for detecting patterns of usage for "Bobby." Any changes are reported back to the media broker 26 and subsequently used by the media broker 26 to detect patterns for "Bobby." Lastly, the user information area 72 includes a Send Msg button 76 that, when actuated by the administrator 28, enables the administrator 28 to send a message to "Bobby." The message is preferably then returned to the media broker 26, which then causes the message to be presented to "Bobby" via one of the media devices 14.

The user screen 70 also includes a first pattern area 78 that includes information regarding the first of the two patterns detected for "Bobby." The first pattern area 78 also includes a View Segments button 80 that, when actuated by the administrator 28, causes the media segments in the first pattern to be presented to the administrator 28. Lastly, the first pattern area 78 includes a Respond button 82 that, when actuated by the administrator 28, enables the administrator 28 to respond to the detection of the first pattern by, for example, blocking the first pattern. In a similar manner, the user screen 70 includes a second pattern area 84 that includes information regarding the second of the two patterns detected for "Bobby." The second pattern area 84 also includes a View Segments button 86 that, when actuated by the administrator 28, causes the media segments in the second pattern to be presented to the administrator 28. Lastly, the second pattern area 84 includes a Respond button 88 that, when actuated by the administrator 28, enables the administrator 28 to respond to the detection of the second pattern by, for example, blocking the second pattern.

FIG. 8 illustrates the GUI 56 after the administrator 28 has actuated the View Segments button 80 for the first pattern of FIG. 7 according to one embodiment of the present disclosure. As illustrated, in response to actuation of the View Segments button 80 by the administrator 28, the GUI 56 is updated to present a pattern viewing screen 90. The pattern viewing screen 90 includes a viewing area 92 in which the media segments in the pattern are presented to the administrator 28 and corresponding playback control buttons 94-98 that enable the administrator 28 to control playback of the media segments in the viewing area 92. In addition, the pattern viewing screen 90 includes a Block Segment button 100 that, when actuated by the administrator 28, causes the individual media segment in the pattern being currently presented in the viewing area 92 to be blocked. A Block Pattern button 102, when actuated by the administrator 28, causes the pattern, or more specifically all of the media segments in the pattern, to be blocked. An Ignore button 104, when actuated by the administrator 28, indicates that the current media segment being presented in the viewing area 92 is not to be blocked. An Ignore All button 105, when actuated by the administrator 28, indicates that all of the media segments in the pattern are not to be blocked.

In this embodiment, the pattern viewing screen 90 also includes a list of common tags, or keywords, describing the content of the media segments in the pattern and corresponding check boxes 106 and 108. The administrator 28 is enabled to select the check boxes 106 and 108 to indicate that the corresponding tags, or keywords, are reasons for blocking the media segment or pattern (depending on whether the Block Segment button 100 or the Block Pattern button 102 is actuated). Still further, an Add Tag button 110 enables the administrator 28 to add one or more additional tags as reasons for choosing to block the media segment or pattern. Lastly, the pattern viewing screen 90 includes screenshots 112-118 of the other media segments in the pattern, where the administrator 28 may be enabled to navigate to the other media segments such that those media segments are presented in the viewing area 92 by selecting the corresponding screenshots 112-118.

Figure 9:
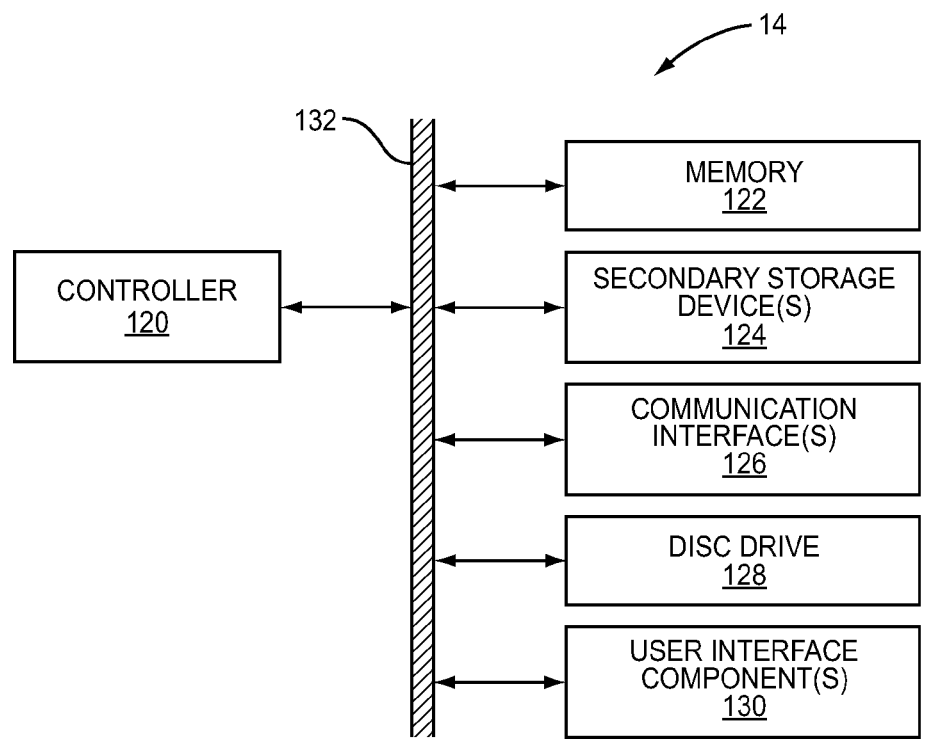
FIG. 9 is a block diagram of one of the media devices of FIG. 1 according to one embodiment of the present disclosure.

FIG. 9 is a block diagram of one of the media devices 14 of FIG. 1 according to one embodiment of the present disclosure. As illustrated, the media device 14 includes a controller 120 connected to memory 122, one or more secondary storage devices 124, one or more communication interfaces 126, a disc drive 128, and one or more user interface components 130 by a bus 132 or similar mechanism. The controller 120 is a microprocessor, digital Application Specific Integrated Circuit (ASIC), Field-Programmable Gate Array (FPGA), or the like. In this embodiment, the controller 120 is a microprocessor, and the playback and control function 36, the recorder 42, and the transmitter 46 (FIG. 2) are implemented in software and stored in the memory 122 for execution by the controller 120. The one or more secondary storage devices 124 may be, for example, one or more hard disk drives. The secondary storage devices 124 may be used to store the local content repository 40 and the local guide(s) 44 (FIG. 2). The one or more communication interfaces 126 include a wired or wireless interface to the LAN 16 (FIG. 1). In addition, the one or more communication interfaces 126 may include a wired or wireless connection to the one or more remote content sources 20 (FIG. 1). Alternatively, the same communication interface 126 may be used to connect to the LAN 16 and the one or more remote content sources 20. The one or more communication interfaces 126 may also include an Infra-red (IR) receiver for receiving commands from an associated remote control. The disc drive 128 may be or include the DVD or Blu-ray disc drive 38 of FIG. 2. Lastly, the one or more user interface components 130 may include one or more user input components (e.g., buttons, a keypad, or a touchscreen), or the like.

Figure 10:
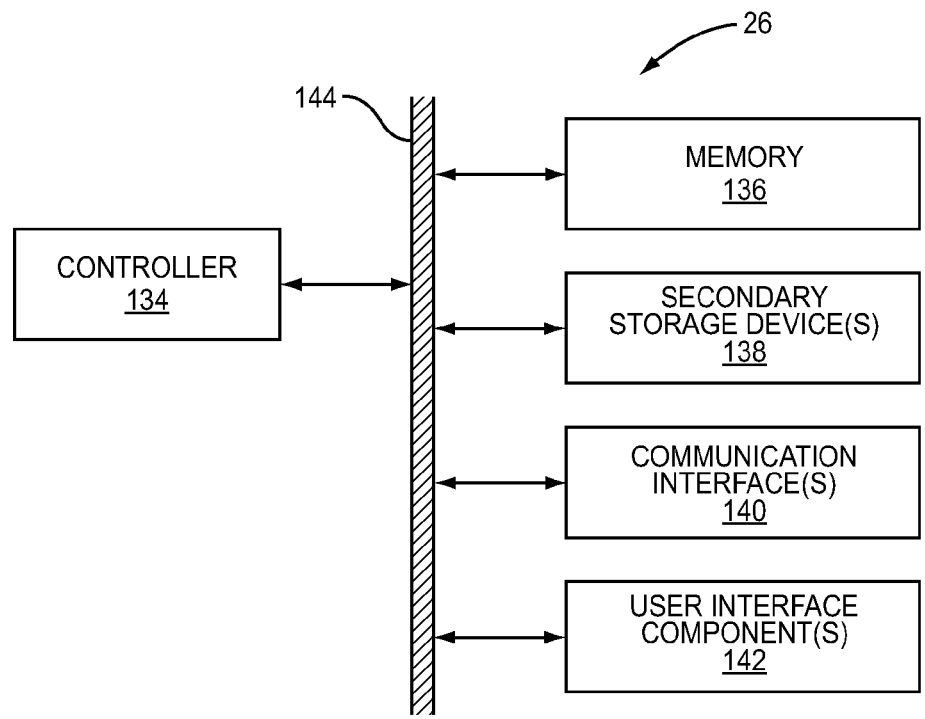
FIG. 10 is a block diagram of the media broker of FIG. 1 according to one embodiment of the present disclosure.

FIG. 10 is a block diagram of the media broker 26 of FIG. 1 according to one embodiment of the present disclosure. As illustrated, the media broker 26 includes a controller 134 connected to memory 136, one or more secondary storage devices 138, one or more communication interfaces 140, and one or more user interface components 142 by a bus 144 or similar mechanism. The controller 134 is a microprocessor, digital ASIC, FPGA, or the like. In this embodiment, the controller 134 is a microprocessor, and the aggregator 48 and the usage monitoring and control function 52 (FIG. 3) are implemented in software and stored in the memory 136 for execution by the controller 134. The one or more secondary storage devices 138 may be, for example, one or more hard disk drives. The secondary storage devices 138 may be used to store the merged guide 50 and the usage data repository 54 (FIG. 3). The one or more communication interfaces 140 include a wired or wireless interface to the LAN 16 (FIG. 1) and a wired or wireless connection to the network 34 (FIG. 1). Lastly, the one or more user interface components 142 may include a display, one or more user input components (e.g., buttons, a keypad, or a touchscreen), or the like.

Figure 11:
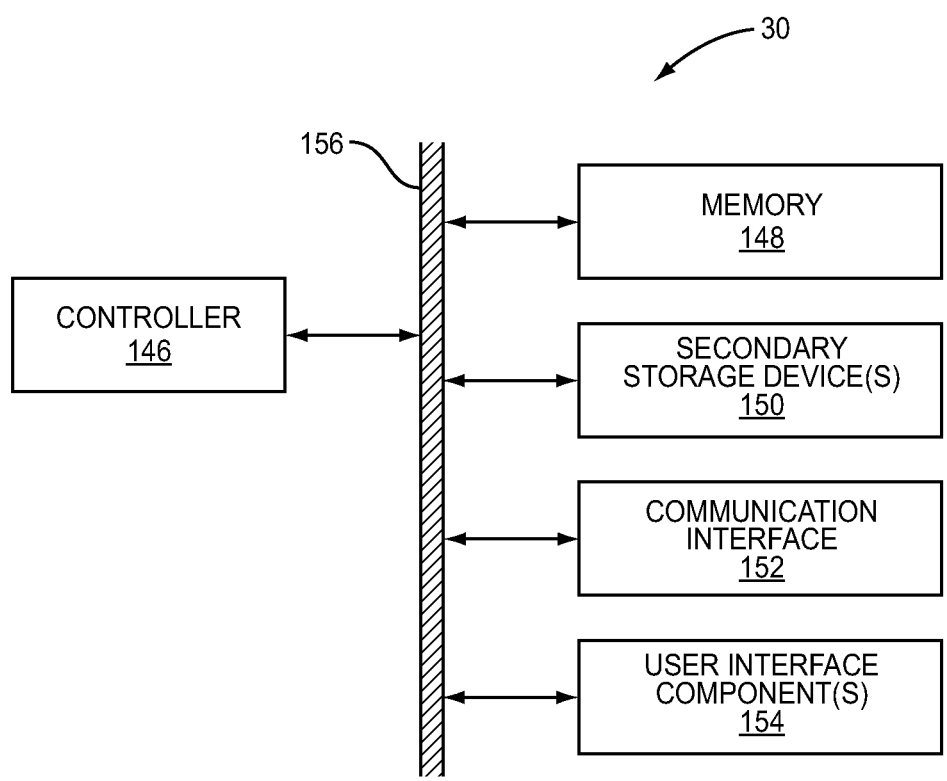
FIG. 11 is a block diagram of the mobile device of FIG. 1 according to one embodiment of the present disclosure.

FIG. 11 is a block diagram of the mobile device 30 of FIG. 1 according to one embodiment of the present disclosure. As illustrated, the mobile device 30 includes a controller 146 connected to memory 148, one or more secondary storage devices 0, a communication interface 152, and one or more user interface components 154 by a bus 156 or similar mechanism. The controller 146 is a microprocessor, digital ASIC, FPGA, or the like. In this embodiment, the controller 146 is a microprocessor, and the client 32 (FIG. 1) is implemented in software and stored in the memory 148 for execution by the controller 146. The one or more secondary storage devices 150 may be, for example, one or more hard disk drives. The communication interface 152 is preferably a local wireless interface (e.g., IEEE 802.11x or Wi-Fi interface) or a cellular communications interface (e.g., 3G or 4G cellular communications interface) that connects the mobile device 30 to the network 34 (FIG. 1). Lastly, the one or more user interface components 154 may include a display, a speaker, one or more user input components (e.g., buttons, a keypad, or a touchscreen), or the like.

Those skilled in the art will recognize improvements and modifications to the preferred embodiments of the present disclosure. All such improvements and modifications are considered within the scope of the concepts disclosed herein and the claims that follow.

What is claimed is:

1. A device comprising:
a communication interface; and
a controller associated with the communication interface and associated with at least one processor, the controller configured to:
obtain usage data defining usage of media content;
detect a pattern in media segments in the media content based on the usage data, the pattern detected when the media segments satisfy at least one defined criterion and are consumed at least a predefined threshold amount; and
block usage of at least one of the media segments.

2. The device of claim 1 wherein the predefined threshold amount includes a predefined threshold number of times that each media segment in the pattern is to be consumed.

3. The device of claim 1 wherein the predefined threshold amount includes a predefined threshold total number of times consumed for all media segments in the pattern.

4. The device of claim 1 wherein the at least one defined criterion comprises at least one criterion defining requisite content of the media segments.

5. The device of claim 1 wherein the at least one defined criterion comprises at least one criterion based on metadata describing media items of which the media segments are part.

6. The device of claim 1 wherein the at least one defined criterion comprises at least one criterion based on contextual data describing a context in which the media items are consumed.

7. The device of claim 1 wherein in detecting the pattern, the controller is further configured to:
use one or more predefined pattern detection rules comprising one or more pattern detection rules that state that a pattern is to be detected when usage of the media segments is different than usage in the past of at least one of a group consisting of: the media segments or other media segments similar to the media segments.

8. The device of claim 1 wherein the controller is configured to provide the metadata describing the content of the media segments included in the pattern.

9. The device of claim 1 wherein the controller is further configured to:
provide a first subset of the media segments included in the pattern for display; and
provide metadata describing content of a second subset of the media segments included in the pattern for display.

10. The device of claim 1 wherein in blocking usage of the media segments, the controller is configured to block usage of all of the media segments included in the pattern.

11. The device of claim 1 wherein in blocking usage of the at least one of the media segments, the controller is configured to block usage of one or more select media segments from the media segments included in the pattern.

12. The device of claim 1 wherein the controller is further configured to:
identify one or more additional media segments of the media content that are similar to the at least one of the media segments for which usage is blocked; and
block usage of at least one of the one or more additional media segments.

13. The device of claim 12 wherein the controller is further configured to:
display, for each additional media segment of the one or more additional media segments, the additional media segment and metadata describing content of the additional media segment.

14. The device of claim 12 wherein the one or more additional media segments that are similar to the at least one of the media segments for which usage is blocked are one or more media segments of the media content having metadata that matches metadata describing content of the at least one of the media segments for which usage is blocked to at least a predefined threshold degree.

15. The device of claim 12 wherein the one or more additional media segments that are similar to the at least one of the media segments for which usage is blocked are one or more media segments of the media content having metadata that matches at least one criteria for blocking usage of the at least one of the one or more media segments.

16. A system for monitoring and blocking usage of media content, the system comprising:
- at least one media broker sending communications to and receiving communications from one or more mobile devices, the at least one media broker configured to:
  - obtain usage data defining usage of media content at one or more of the one or more mobile devices;
  - detect a pattern including at least one media segment in the media content consumed based on the usage data and one or more predefined pattern detection rules; and
  - lock usage of the at least one media segment included in the pattern.

17. The system of claim 16, wherein the media content is time shifted.

18. The system of claim 16 the system further comprising a media broker client hosted by one of the mobile devices and in communication with the media broker, the media broker client configured to:
- receive the pattern from the media broker; and
- send the indication to block usage of the at least one media segment to the media broker.

19. A device comprising:
- a communication interface; and
- a controller associated with the communication interface and associated with at least one processor, the controller configured to:
  - obtain usage data defining usage of media content accessible to one or more media devices;
  - identify one or more media segments that contain media content based on the usage data, the one or more media segments satisfying at least one defined criterion and consumed at least a predefined threshold amount;
  - block usage of at least one of the one or more media segments at the one or more media devices;
  - identify one or more additional media segments of the media content accessible to the one or more media devices that are similar to the at least one of the one or more media segments for which usage is blocked at the one or more media devices; and
  - block usage of at least one of the one or more additional media segments at the one or more media devices.

* * * * *